Nov. 24, 1953      L. F. KNIGHT      2,660,279
FLUID CLUTCH

Filed May 13, 1949      3 Sheets-Sheet 1

Inventor
LORNE F. KNIGHT
By: Fetherstonhaugh & G.
Att'ys

Inventor
LORNE F. KNIGHT
By: Fetherstonhaugh & Co.
Att'ys

Nov. 24, 1953 L. F. KNIGHT 2,660,279
FLUID CLUTCH
Filed May 13, 1949 3 Sheets-Sheet 3

Inventor
LORNE F. KNIGHT
By: Fetherstonhaugh & Co.
Att'ys

Patented Nov. 24, 1953

2,660,279

UNITED STATES PATENT OFFICE 2,660,279

FLUID CLUTCH

Lorne F. Knight, Toronto, Ontario, Canada, assignor to Massey-Harris Co. Ltd., Toronto, Ontario, Canada Application May 13, 1949, Serial No. 92,981

6 Claims. (Cl. 192—58)

This invention relates to improvements in fluid clutches of the fluid locking type.

In relatively heavy duty types of vehicles, such as tractors and the like, the clutch is required to transmit the driving force under nearly full-load conditions for a considerable period of time in various operations. Purely mechanical or friction clutches, although used widely in such applications are subject to considerable wear necessitating parts replacement usually more frequently than is desirable. By the nature of the type of work to which tractors are adapted, the engine drive mechanisms must in all cases be kept as simple as possible and be readily accessible for replacement and/or repair. Under these circumstances, prior fluid clutches are not helpful because of undue complication in the components. These characteristics result in a relatively high cost of manufacture and lead to difficulties of maintenance. Further, prior fluid clutch devices generally are not adapted in their characteristics for design according to a substantially full-load condition for a relatively long period of time.

According to the present invention, a fluid clutch of the fluid locking type and of simplified character is provided which is relatively inexpensive to manufacture and which utilizes an inward flow pumping principle. A simple internal valve element is adopted which may serve to increase the pumping resistance of fluid circulation until finally fluid lock is obtained by means of the valve element completely interrupting fluid circulation according to the actuation of a clutch pedal by the operator.

The invention will now be described more particularly with reference to the accompanying drawings wherein, Figure 1 is a view of the clutch of the present invention with a cover plate removed, the same being view 1—1 of Figure 2.

Figure 1:
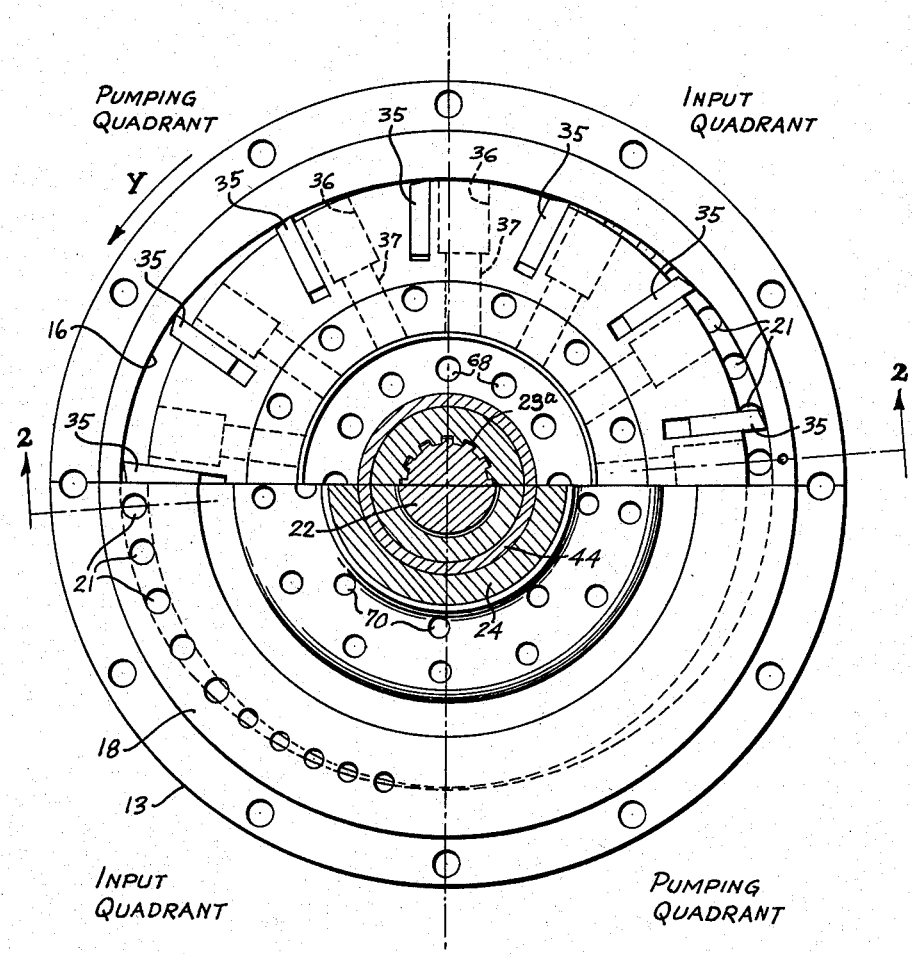
Figure 2:
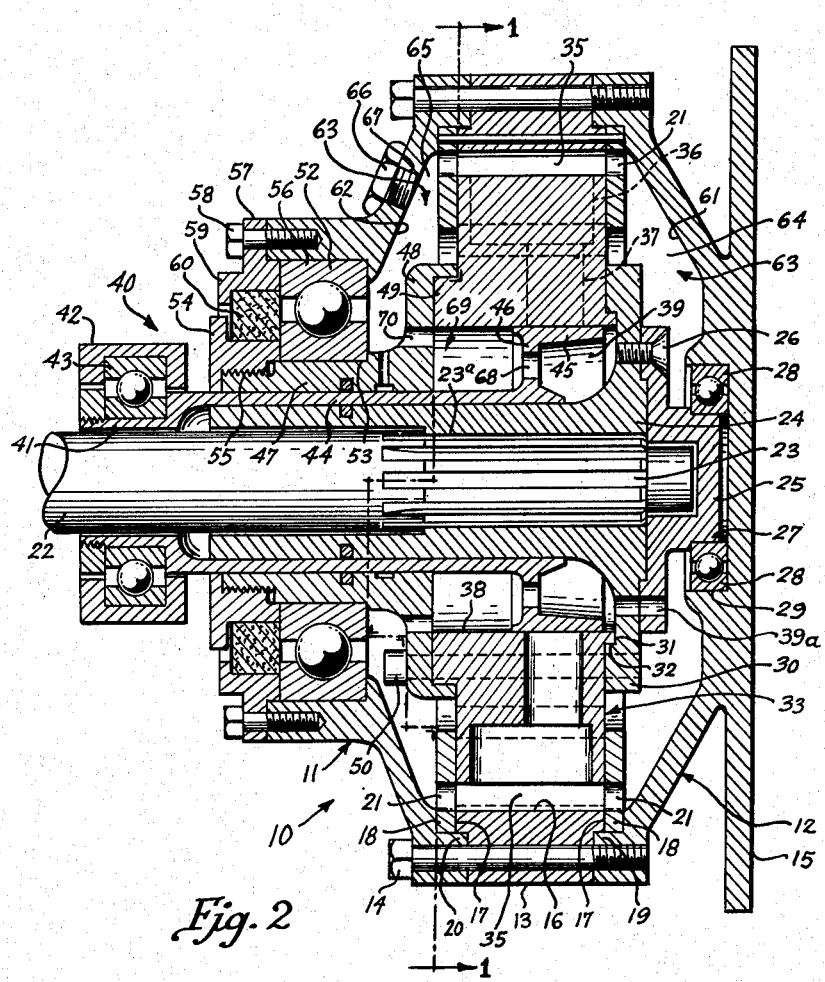
Figure 2 is a sectional view of the clutch device of Figure 1 showing both cover plates and the valve device in place.

Referring to Figures 1 and 2, the clutch of the invention is comprised of a main housing or casing 10 formed of the rear cover or side plate 11 and the mounting or front side plate or cover 12 held spaced apart by an outer separating ring 13 and fastened together by suitable bolts 14. The front cover 12 is fastened to the fly-wheel say of a driving motor or is otherwise connected to the driving shaft of the motor or engine served by the present clutch by means of the mounting plate 15 and suitable bolts (not shown). Obviously, however, the front cover 12 may be fastened in any suitable manner to a driving shaft.

The separating ring 13 includes an inner eccentric bore 16 which preferably is doubly eccentric as illustrated in Figure 1. The ring 16 is of enlarged width with regard to the separating ring 13 and is machined on its side faces 17 to serve as a spacer for the port plates 18 which are in the form of annular rings held into engagement with the faces 17 by the shoulders or stepped portions 19 and 20 of the front cover 12 and rear cover 11 respectively. As illustrated in Figure 1 the port plates 18 each carry a series of ports 21 arranged in the designated input quadrants of the clutch.

It is now relevant to discuss the rotor pumping structure which is operatively connected to the transmission of the vehicle. Thus, in Figure 1 the transmission shaft 22 has the splined end portion 23 seated in the rotor carrier socket or bore 23a and slidably carrying the rotor carrier 24 to allow for end play between the transmission shaft 22 and the mounting plate 15. An end cap 25 is mounted on the rotor carrier 24 by suitable bolts 26 and has a bearing portion 27 aligned within the roller bearings 28 carried in the recess 29 of the front cover 12. In this manner shaft 22 is aligned concentrically with the spacer ring 13 and the housing 10. The rotor carrier 24 has a flange 30 recessed inwardly as at 31 to accommodate the inner annular shoulder 32 of the pump rotor structure 33.

Figure 4:
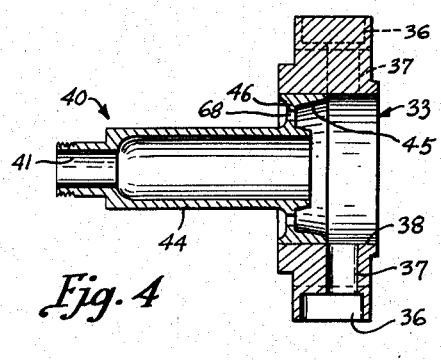
Figure 4 is a general view of a suitable clutch pedal assembly mounted in conjunction with the clutch of the present invention associated with a driving motor.
Figure 3:
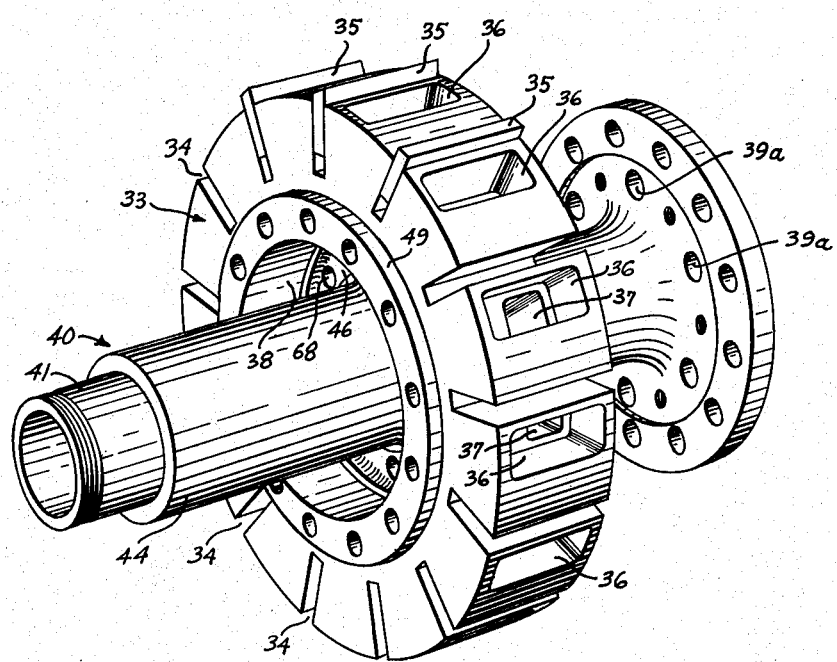
Figure 3 is a perspective view of the pump rotor of the clutch including the clutch valve element slidable axially therein.

Referring also to Figure 3 the rotor structure 33 is comprised of an annular body having radially disposed cut-away portions or sockets 34 designed to slidably accommodate eccentric type pumping vanes 35 which preferably include spring means (not shown) designed to normally urge the same outwardly under light spring pressure. Between each pumping vane is located a reservoir pocket 36 through which pumped fluid is conducted inwardly to a control port 37. As shown in Figure 1 the control ports constitute only a limited portion of the width dimension of the rotor 33 and terminate in the inner surface 38 of the rotor to deliver fluid into the inner annular chamber 39 when unobstructed. According to the invention, however, a control valve member 40 is utilized which carries at its actuating end 41 an actuating collar 42 mounted thereon by a suitable bearing 43 if desired. From the actuating end 41 the valve member continues in the form of a sleeve portion 44 slidably mounted on the rotor carrier 24 and terminating in the valve flange 45 which is carried by the supporting web 46. The inner surfaces of the flange 45 and web 46 in conjunction with the adjacent surfaces of the rotor carrier 24 constitute the boundaries of the chamber 39, the valve member 40 being designed for slidable movement in the axial direction to cause the flange 45 to close over the control ports 37 in a progressive manner. In the withdrawn position of the valve member as illustrated in Figure 4 the control ports are completely open to the chamber 39 and are not obstructed in any manner by the flange 45.

The rotor body 33 is held in assembled relation with the rotor carrier 24 by means of the retaining member 47 having a flange 48 designed to grip the shoulder portion 49 of the rotor body. The flanges 48 and 30 are held fixed to the rotor by means of suitable bolts 50 passing through the latter.

The retaining member carries a suitable ball bearing 52 held within the stepped portion 53 by the locking ring 54 fastenable thereto by means of the threads 55. Bearing 52 rests also in the annular recess 56 of the rear cover or side plate 11 being held fixed with respect thereto and in alignment by means of the retaining ring 57 fastened to the side plate by means of suitable bolts 58 and including an inner depending annular flange 59 holding a felt sealing ring 60.

It will be observed that the inner walls 61 and 62 of the front and rear covers respectively define boundaries of a reservoir 63 in conjunction with the rotor structure. The reservoir 63 is comprised of the annular chambers 64 and 65 which are in communication with one another by way of input ports 21 in the region of the input quadrants since in such regions the outer surfaces of the rotor body are in spaced apart relation to the inner surfaces of bores 16 of the eccentric ring 13.

As shown the rear cover 11 has a suitably threaded stopper 66 inserted in the threaded opening 67 through which a suitable oil or other clutch fluid may be introduced into the chamber or reservoir 63. Preferably a small air space is left in the reservoir.

In operation the outer housing and the eccentric ring 13 will be caused to move in the counter-clockwise direction say, in Figure 1, as illustrated by arrow Y. It will be assumed that the actuating member 40 is withdrawn whereby the control ports 37 have free access to the annular chamber 39 as illustrated in Figure 4. In this condition where the shaft 22 lags the rotation of the housing, the pump vanes 35 in passing around the input quadrants will cause clutch fluid in the reservoir 63 to be drawn through the input ports 21. As this fluid is carried by the rotor vanes to the output quadrants the fluid will be forced inwardly through the reservoir ports 36 and control ports 37 to the annular chamber 39. The web 46 of the control valve member 40 carries a plurality of communicating ports 68 whereby the clutch fluid is allowed to pass to the secondary annular chamber 69 and thence through the discharge ports 70 in the retaining flange 48 to the reservoir 63. The pumped clutch fluid may also pass from primary chamber 39 through port 39a to the reservoir. It will be therefore apparent that in the withdrawn position of the control valve member 40 the clutch fluid merely circulates from the reservoir 63 inwardly through the rotor and primary and secondary chambers 39 and 69 back to the reservoir. Thus fluid flow during the pumping action may be described as "inward toroidal" in the sense that the fluid circulating through each of chambers 64 and 65 and inwardly through the common rotor is in the general form of two bodies of fluid each in the general disposition of toroid segments in the region of the input quadrants. Adjacent and opposed toroid segments have fluid flow during the pumping action each toward the other and inwardly and commonly of the rotor.

As the flanges 45 of the control valve member 40 are advanced over the control ports 37 by the operator advancing the actuating end 41, the resistance to the pumping action in inward toroidal circulation or flow is increased whereby rotative movement is imparted to the rotor and shaft 22. In the final closed position of the valve member fluid flow is completely interrupted and fluid locking effect takes place whereby the housing structure and the rotor and shaft 22 move together.

Figure 5:
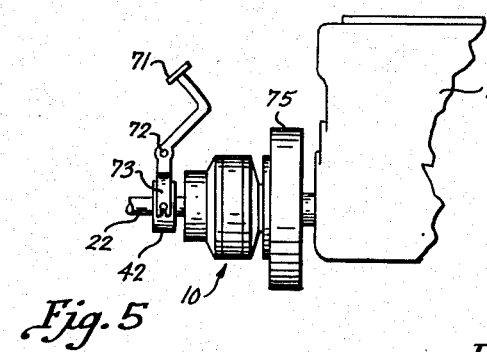
Figure 5 is a general elevation of the preferred method of mounting the present clutch in a motor drive and transmission system.

In Figure 5 the preferred mounting arrangement is illustrated for a clutch according to the invention showing a clutch pedal 71 pivoted as at 72 and carrying a yoke 73 engaging pins 74 extending from the collar 42 for actuation of the valve member. It will be apparent that many alternatives are available in the specific mounting of the clutch housing 10 to the fly-wheel 75 say of an engine 76. Whatever specific arrangement is resorted to in the mounting of the clutch and the actuation of its valve member, the advantages of the simplicity afforded by the structure of the present invention will be realized.

When the valve member is in the full open position so that the control ports 37 are unobstructed, the circulation of the fluid in the pump depends upon the difference in fluid conducting areas of the control ports 37 and the input ports 21.

Figure 6:
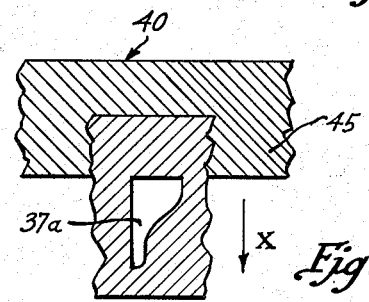
Figure 6 is a sectional view of a modified form of control port wherein the port is shaped to provide smooth action in the clutch.

However, in order to accomplish smooth action of varying the resistance of fluid flow in the clutch, I prefer to shape the control ports as indicated by the sectional view of a control port 37a in Figure 6. This view is in a direction radially and inwardly of the rotor on a circumferential line between the inner chamber of the rotor and a reservoir pocket 36. In any case, it will be appreciated that it is only the exit contour of the control port which is essentially important in this connection. It will be observed in the figure that the flange 45 of the valve member 40 advances in the direction of arrow X in the closing action and at first quickly decreases the sectional area of the port in its advancing movement. The port is shaped so that the remaining cut-off action or valve action gradually increases fluid flow resistance until the port is sealed by the flange 45.

Obviously various forms may be resorted to in order to accomplish a substantially straight line relationship with respect to the movement of the clutch and the increase in resistance to fluid flow in order to get a substantially straight line relation between the movement of the valve member and the torque transmitted by the clutch. It may be even desirable to divert from straight line relation in this respect. Therefore, the shape design is dependent upon the conditions desired.

A factor worthy of mention in connection with the present clutch is that, due to the inward pumping action, that is to say the flow of the pumped fluid inwardly of the rotor, heating of the oil or clutch fluid during torque transmission is modified due to the effect of centrifugal forces, that is to say, the warmer fluid will be of slightly less density and will tend to stay in the centre region of the fluid reservoir. Therefore, during the pumping action, the fluid drawn by the pump vanes will be the coolest of the fluid in the reservoir. This is a substantial advantage in that temperature conditions by nature of the direction of flow of the fluid are kept to a minimum in the type of clutch described. With regard to heating, in certain cases, I prefer to include radiating vanes or fins or other radiating means on the exterior surfaces of the housing and clutch components. This will usually only be required, however, where the clutch is of a heavy duty type required for extended duty cycle operations and where the volume of fluid in the reservoir must be kept to a minimum.

It will be appreciated that when the valve member is open and the clutch is effectively free running a suitable braking device obviously should be provided to arrest rotation of that shaft extending to a gear change or drive ratio device so that a gear change may be effected without damage or undue noise.

Obvious alternatives will be evident in the specific form of the various components from the point of view of facility of assembly and the like. The spirit of the invention however pertains to the inclusion of an inner valve member controlling an inwardly flowing circulatory system of fluid pumping in toroidal disposition in an eccentric pumping device with the attendance of simplicities of structural arrangement illustrated. It is intended that the present disclosure should not be limited in any sense aside from the scope illustrated by the following claims.

What I claim as my invention is:

1. In a hydraulic clutch of the sliding vane class, the combination of: a housing in the form of an outer rotatable casing forming one clutch element; a vane carrying rotor of annular form in said casing; a rotor carrier in the form of a hollow shaft flared at one end to provide a radially extending mounting flange thereon; means supporting said rotor carrier co-axially with said rotatable casing; means for fastening said mounting flange to said rotor to support the latter co-axially with said rotor carrier and in annular spaced apart relation to the hollow shaft portion of the latter to define an annular chamber between said rotor and said rotor carrier; radially directed fluid conducting passages extending through said rotor between the sliding vanes carried thereby; a valve of annular form designed to articulate over the inner terminus of the passages of said rotor and slidable axially in said annular chamber; and a sleeve forming a part of said valve supported by the hollow shaft portion of said rotor carrier and extending therebeyond exteriorly of the housing in a direction away from the flange portion of the rotor carrier.

2. In a hydraulic clutch of the sliding vane class, the combination of: a housing in the form of an outer rotatable casing forming one clutch element; a vane carrying rotor of annular form in said casing; a rotor carrier in the form of a hollow shaft flared at one end to provide a radially extending mounting flange thereon; means supporting said rotor carrier co-axially with said rotatable casing; means for fastening said mounting flange to said rotor to support the latter co-axially with said rotor carrier and in annular spaced apart relation to the hollow shaft portion of the latter to define an annular chamber between said rotor and said rotor carrier; radially directed fluid conducting passages extending through said rotor between the sliding vanes carried thereby; a valve of annular form designed to articulate over the inner terminus of the passages of said rotor and slidable axially in said annular chamber; a sleeve forming a part of said valve supported by the hollow shaft portion of said rotor carrier and extending therebeyond exteriorly of the housing in a direction away from the flange portion of the rotor carrier; a shaft slidable axially within the hollow shaft portion of said rotor carrier; and means connecting said shaft with said rotor carrier for rotation therewith.

3. In a hydraulic clutch of the sliding vane class, the combination of: a housing in the form of an outer rotatable casing forming one clutch element; a vane carrying rotor of annular form in said casing; a rotor carrier in the form of a hollow shaft flared at one end to provide a radially extending mounting flange thereon; means supporting said rotor carrier co-axially with said rotatable casing; means for fastening said mounting flange to said rotor to support the latter co-axially with said rotor carrier and in annular spaced apart relation to the hollow shaft portion of the latter to define an annular chamber between said rotor and said rotor carrier; radially directed fluid conducting passages extending through said rotor between the sliding vanes carried thereby; a valve of annular form designed to articulate over the inner terminus of the passages of said rotor and slidable axially in said annular chamber; a sleeve forming a part of said valve supported by the hollow shaft portion of said rotor carrier and extending therebeyond exteriorly of the housing in a direction away from the flange portion of the rotor carrier; side walls forming a part of said housing and rotatable casing, disposed in spaced relation to said vane carrying rotor to define fluid reservoirs on either side thereof; and means communicating said annular chamber between said rotor and said rotor carrier, with said reservoirs.

4. In a hydraulic clutch of the sliding vane class, the combination of: a housing in the form of an outer rotatable casing forming one clutch element; a vane carrying rotor of annular form in said casing; a rotor carrier in the form of a hollow shaft flared at one end to provide a radially extending mounting flange thereon; means supporting said rotor carrier co-axially with said rotatable casing; means for fastening said mounting flange to said rotor to support the latter co-axially with said rotor carrier and in annular spaced apart relation to the hollow shaft portion of the latter to define an annular chamber between said rotor and said rotor carrier; radially directed fluid conducting passages extending through said rotor between the sliding vanes carried thereby; a valve of annular form designed to articulate over the inner terminus of the passages of said rotor and slidable axially in said annular chamber; a sleeve forming a part of said valve supported by the hollow shaft portion of said rotor carrier and extending therebeyond exteriorly of the housing in a direction away from the flange portion of the rotor carrier;

side walls forming a part of said housing and rotatable casing, disposed in spaced relation to said vane carrying rotor to define fluid reservoirs on either side thereof; means communicating said annular chamber between said rotor and said rotor carrier with said reservoirs; an annular port plate on each side of said rotor closely engaging the side thereof but spaced from said rotor carrier; and a plurality of input ports in each port plate.

5. In a hydraulic clutch of the sliding vane class, the combination of: a housing in the form of an outer rotatable casing forming one clutch element; a vane carrying rotor of annular form in said casing; a rotor carried in the form of a hollow shaft flared at one end to provide a radially extending mounting flange thereon; means supporting said rotor carried co-axially with said rotatable casing; means for fastening said mounting flange to said rotor to support the latter coaxially with said rotor carrier and in annular spaced apart relation to the hollow shaft portion of the latter to define an annular chamber between said rotor and said rotor carrier; radially directed fluid conducting passages extending through said rotor between the sliding vanes carried thereby; a valve of annular form designed to articulate over the inner terminus of the passages of said rotor and slidable axially in said annular chamber; a sleeve forming a part of said valve supported by the hollow shaft portion of said rotor carrier and extending therebeyond exteriorly of the housing in a direction away from the flange portion of the rotor carrier; side walls forming a part of said housing and rotatable casing, disposed in spaced relation to said vane carrying rotor to define fluid reservoirs on either side thereof; means communicating said annular chamber between said rotor and said rotor carrier, with said reservoirs; and a separating ring forming a part of said rotatable casing extending about said rotor and having a doubly eccentric bore defining pumping and input quadrants for said clutch in conjunction with said rotor.

6. In a hydraulic clutch of the sliding vane class, the combination of: a housing in the form of an outer rotatable casing forming one clutch element; a vane carrying rotor of annular form in said casing; a rotor carried in the form of a hollow shaft flared at one end to provide a radially extending mounting flange thereon; means supporting said rotor carrier co-axially with said rotatable casing; means for fastening said mounting flange to said rotor to support the latter coaxially with said rotor carrier and in annular spaced apart relation to the hollow shaft portion of the latter to define an annular chamber between said rotor and said rotor carrier; radially directed fluid conducting passages extending through said rotor between the sliding vanes carried thereby; a valve of annular form designed to articulate over the inner terminus of the passage of said rotor and slidable axially in said annular chamber; a sleeve forming a part of said valve supported by the hollow shaft portion of said rotor carrier and extending therebeyond exteriorly of the housing in a direction away from the flange portion of the rotor carrier; side walls forming a part of said housing and rotatable casing, disposed in spaced relation to said vane carrying rotor to define fluid reservoirs on either side thereof; means communicating said annular chamber between said rotor and said rotor carrier, with said reservoirs; a separating ring forming a part of said rotatable casing extending about said rotor and having a doubly eccentric bore defining pumping and input quadrants for said clutch in conjunction with said rotor; an annular port plate extending from said separating ring radially inwardly on each side of said rotor but spaced from said rotor carrier; and a series of input ports in each port plate in opposed input quadrants of said clutch.

LORNE F. KNIGHT.

References Cited in the file of this patent

UNITED STATES PATENTS

| Number | Name | Date |
|---|---|---|
| 1,136,168 | Rich | Apr. 20, 1915 |
| 1,186,132 | Rich | June 6, 1916 |
| 2,052,429 | Tyler | Aug. 26, 1936 |
| 2,115,244 | Savage | Apr. 26, 1938 |